US010293299B2

(12) United States Patent
Laroche et al.

(10) Patent No.: US 10,293,299 B2
(45) Date of Patent: May 21, 2019

(54) HYBRID SOLVENT FORMULATIONS FOR TOTAL ORGANIC SULFUR REMOVAL AND TOTAL ACIDIC GAS REMOVAL

(71) Applicant: Dow Global Technologies LLC, Midland, MI (US)

(72) Inventors: Christophe R. Laroche, Lake Jackson, TX (US); Gerardo Padilla, Lake Jackson, TX (US); John R. Dowdle, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/032,868

(22) PCT Filed: Oct. 24, 2014

(86) PCT No.: PCT/US2014/062163
§ 371 (c)(1),
(2) Date: Apr. 28, 2016

(87) PCT Pub. No.: WO2015/065842
PCT Pub. Date: May 7, 2015

(65) Prior Publication Data
US 2016/0288046 A1 Oct. 6, 2016

Related U.S. Application Data

(60) Provisional application No. 61/897,687, filed on Oct. 30, 2013.

(51) Int. Cl.
*C10G 29/20* (2006.01)
*B01D 53/14* (2006.01)
*C10L 3/10* (2006.01)

(52) U.S. Cl.
CPC ..... *B01D 53/1493* (2013.01); *B01D 53/1456* (2013.01); *B01D 53/1468* (2013.01); *B01D 53/1475* (2013.01); *B01D 53/1487* (2013.01); *C10L 3/103* (2013.01); *B01D 2252/103* (2013.01); *B01D 2252/202* (2013.01); *B01D 2252/2025* (2013.01); *B01D 2252/2026* (2013.01); *B01D 2252/2028* (2013.01); *B01D 2252/20426* (2013.01); *B01D 2252/20431* (2013.01); *B01D 2252/20489* (2013.01); *B01D 2252/504* (2013.01); *B01D 2252/602* (2013.01); *B01D 2256/24* (2013.01); *B01D 2257/302* (2013.01); *B01D 2257/304* (2013.01); *B01D 2257/306* (2013.01); *B01D 2257/308* (2013.01); *B01D 2257/504* (2013.01); *C10L 2290/541* (2013.01)

(58) Field of Classification Search
CPC ............ B01D 53/1462; B01D 53/1468; B01D 53/1475; B01D 53/1487; B01D 53/1493; B01D 2252/2023; B01D 2252/20478; C10G 29/20
See application file for complete search history.

(56) References Cited

U.S. PATENT DOCUMENTS

| | | | |
|---|---|---|---|
| 4,044,100 A * | 8/1977 | McElroy, Jr. | B01D 53/1493 423/226 |
| 4,085,192 A | 4/1978 | VanScoy | |
| 4,336,233 A | 6/1982 | Appl et al. | |
| 4,405,585 A | 9/1983 | Sartori et al. | |
| 4,484,934 A | 11/1984 | Ferrin et al. | |
| 4,545,965 A | 10/1985 | Gazzi et al. | |
| 4,705,673 A * | 11/1987 | Capobianco | B01D 53/1493 252/189 |
| 4,892,674 A | 1/1990 | Ho et al. | |
| 4,997,630 A | 3/1991 | Wagner et al. | |
| 5,705,090 A * | 1/1998 | Garland | B01D 53/1487 208/48 AA |
| 5,736,115 A | 4/1998 | Iijima et al. | |
| 6,337,059 B1 * | 1/2002 | Schubert | B01D 53/1456 252/182.12 |
| 6,436,174 B1 * | 8/2002 | Grossmann | B01D 53/1456 423/226 |
| 7,144,555 B1 * | 12/2006 | Squires | B01D 53/526 422/168 |
| 2010/0087684 A1 * | 4/2010 | Do | C07C 209/16 564/478 |
| 2010/0288125 A1 | 11/2010 | Vorberg et al. | |
| 2012/0073597 A1 * | 3/2012 | Rhee | B08B 3/10 134/1 |
| 2012/0216678 A1 | 8/2012 | Geuzebroek et al. | |
| 2014/0290483 A1 | 10/2014 | Delfort et al. | |

FOREIGN PATENT DOCUMENTS

| | | | |
|---|---|---|---|
| EP | 00887208 | 8/1983 | |
| EP | 0134948 | 3/1985 | |
| EP | 0134948 A2 * | 3/1985 | ......... B01D 53/1468 |
| EP | 2283911 | 2/2011 | |
| FR | 2982170 | 10/2013 | |
| RU | 927282 | 5/1982 | |
| WO | 1986/005474 | 9/1986 | |
| WO | 2005/081778 | 9/2005 | |
| WO | 2014/004019 | 1/2014 | |
| WO | 2014/004020 | 1/2014 | |
| WO | 2015/065839 | 5/2015 | |
| WO | 2015/065842 | 5/2015 | |

OTHER PUBLICATIONS

M. Arifin, "Experimental Study on Acid Gas Removal Using Absorption-Adsorption Unit," Universiti Malaysia Pahang (2009).*
Bottoms, "Organic Amines-Girbotal Process", The Science of Petroleum, 1938, vol. 3, Oxford University Press (6 pages).

* cited by examiner

*Primary Examiner* — Randy Boyer
(74) *Attorney, Agent, or Firm* — Akerman LLP (57) ABSTRACT

A method of treating oil and gas streams to remove total organic sulfur or total acid gas including the step of treating the gas stream with a solution of an amine, physical solvent, and water wherein the amine solution may optionally also contain an activator.

8 Claims, 5 Drawing Sheets

HYBRID SOLVENT FORMULATIONS FOR TOTAL ORGANIC SULFUR REMOVAL AND TOTAL ACIDIC GAS REMOVAL

CROSS-REFERENCE TO RELATED APPLICATIONS

This application is a national phase of PCT/US2014/062163, filed Oct. 24, 2014, which claims priority to U.S. Provisional Application No. 61/897,687, filed Oct. 30, 2013, the entire contents of both are hereby incorporated by reference.

FIELD OF THE INVENTION

The invention relates generally to amine compositions and processes for removal of acidic sulfur constituents from fluid streams. More specifically, the invention relates to high pKa low dielectric constant amine based compositions and processes for the removal of total organic sulfur from oil and gas streams and alternatively total organic gas removal.

BACKGROUND OF THE INVENTION

Fluid streams derived from natural gas reservoirs, petroleum or coal, often contain a significant amount of acid gases, for example carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), or mercaptans as impurities. These fluid streams may be gas, liquid, or mixtures thereof, for example gases such as natural gas, refinery gas, hydrocarbon gases from shale pyrolysis, synthesis gas, and the like or liquids such as liquefied petroleum gas (LPG) and natural gas liquids (NGL).

Various compositions and processes for removal of acid gases are known and described in the literature. It is well-known to treat gaseous mixtures with aqueous amine solutions to remove these acidic gases. Typically, the aqueous amine solution contact the gaseous mixture comprising the acidic gases counter currently at low temperature and high pressure in an absorber tower. The aqueous amine solution commonly contains an alkanolamine such as triethanolamine (TEA), methyldiethanolamine (MDEA), diethanolamine (DEA), monothenaolamine (MEA), diisopropanolamine (DIPA), or 2-(2-aminoethoxy) ethanol (sometimes referred to as diglycolamine or DGA).

In some cases, an accelerator, is used in combination with the alkanolamines, for example piperazine and MDEA as disclosed in U.S. Pat. Nos. 4,336,233; 4,997,630; and 6,337,059, all of which are incorporated by reference herein in their entirety. Alternately, EP 0134948 discloses mixing an acid with select alkaline materials such as MDEA, to provide enhanced acid gas removal. EP 0134948 teaches that only a select class of alkaline materials mixed with an acid is useable in aqueous alkaline solutions to provide increased acid gas removal.

Tertiary amines, such as 3-dimethylaminopropane-1,2-diol (DMAPD), have been shown to be effective at removing $CO_2$ from gaseous mixtures, see U.S. Pat. No. 5,736,115. Further, in specific processes, e.g., the Girbotol Process, tertiary amines have been shown effective in removal of $H_2S$, but show decreased capacity at elevated temperatures, for examples see "Organic Amines-Girbotol Process", Bottoms, R.R., The Science of Petroleum, volume 3, Oxford University Press, 1938, pp 1810-1815.

Particularly important is the removal of sulfur based contaminants including hydrogen sulfide from fluid streams from oil and gas well due to the highly noxious nature of these gases. Certain attempts at selective removal of sulfur based compounds have been made.

Tertiary alkanolamines such as MDEA are inherently selective for hydrogen sulfide over $CO_2$. Because of increasingly more stringent specifications towards hydrogen sulfide and sulfur dioxide emissions, there is a need for aqueous amine formulations capable of removing hydrogen sulfide selectively over $CO_2$ along with treating the gas to a very low level of $H_2S$ (i.e. 10 ppmv).

EP 01,134,948 discloses the use of low pKa acid additives (lower than 7) to enhance the selective removal of hydrogen sulfide. The technology aims at altering vapor liquid equilibrium characteristics of the alkanolamine solvent in order to achieve lower amount of hydrogen sulfide in the treated gas. U.S. Pat. No. 4,892,674 discloses the use of severely hindered alkanolamine salts as an additive for an MDEA gas treating solvent in order to enhance the selective removal of hydrogen sulfide over $CO_2$ compared to MDEA alone. This technology is a combination of the use of severely sterically hindered amine and low pKa acid additives to MDEA based solvents. US 2010/0288125 discloses the use of phosphonic acid additives in order to enhance hydrogen sulfide selective removal.

U.S. Pat. No. 4,085,192 discloses a process for removal of hydrogen sulfide using an aqueous mixtures of alkanolamine and sulfolane. The preferred amines are diisopropanolamine and methyldiethanolamine. This invention suffers from the limited acid gas carrying capacity of DIPA and MDEA based hybrid formulations.

U.S. Pat. No. 4,405,585 discloses a process and formulation for selective hydrogen sulfide removal using aqueous blends of sterically hindered amines and physical solvent (preferred solvent is sulfolane). This process includes a physical solvent having a high dielectric constant.

U.S. Pat. No. 5,705,090 discloses hybrid formulations for selective hydrogen sulfide removal using aqueous blends of polyethylene glycols and methyldiethanolamine. MDEA based hybrid formulations display low acid gas carrying capacity.

The Amisol process (Kohl & Nielsen, p 1231) uses aqueous blends of methanol and alkanolamines for selective hydrogen sulfide removal. The amines include diisopropylamine and diethylamine which both display low vapor pressure as well as diethanolamine (DEA) which display rather low basicity and is not selective for $H_2S$ over $CO_2$.

WO 86/05474 discloses hybrid solvents for selective hydrogen sulfide removal. Amines include tertiary amines and sterically hindered amines. Physical solvents include glycols, glycol esters, glycol ethers, and N-methylpyrrolidone. These solutions are anhydrous (<5 wt % water).

While the above compounds are effective, they each have limitations which detract from their use in total organic sulfur removal. Therefore, there is a need for formulations allowing for the removal of total organic sulfur compounds.

SUMMARY OF THE INVENTION

In accordance with the invention, there is provided a method for treating oil and gas streams to remove total organic sulfur concentrations. The method comprises the steps of treating oil and gas streams with an amine solution comprising an amine constituent, a physical solvent, and a balance of water. Optionally, the solution of the invention may also comprise an acid source.

A process is described for the removal of total organic sulfur compounds from a gas mixture with a liquid absorbent composition including a tertiary alkanolamine with a pKa superior to 9.0 at 25° C., a physical solvent and water. Generally, the dielectric constant of the physical solvent is lower than about 20 at 25° C., preferably lower than about 15 at 25° C. This dielectric constant is for the equal mass ratio mixture of amine and physical solvent.

In accordance with an alternative aspect of the invention, there is provided a method for total acid gas removal. The method comprises the steps of oil and gas streams with a solution of amine, an activator, a physical solvent and a balance of water. pKa and dielectric constants are as before.

DETAILED DESCRIPTION OF THE INVENTION

The invention is a method for treating oil and gas streams to selectively remove total organic sulfur contaminants. The method comprises the steps of treating the oil and gas streams with an amine solution comprising an effective amount of amine constituent, a physical solvent, and a balance of water. Optionally, the solution of the invention also comprises an acid or acid source.

This invention is applicable for the total removal of acidic gases. The invention is also applicable to any number of alkanolamine solutions which are selective to the removal of acidic gaseous species which are total organic sulfur compounds including mercaptans, COS, $CS_2$, and organic sulfide derivatives, over or in the presence of $CO_2$. In one preferred mode, the process of the invention will remove those species over $CO_2$. The composition and method of the invention is also effective in removing total acidic gas species including HCN, $SO_2$, $H_2S$, CO and $CO_2$.

Generally, amine solutions useful in the invention are those which do not directly react with carbon dioxide to form carbamates. These are generally tertiary amines and sterically hindered amines. Further, it is desired for the amine to have a boiling point of at least about 160° C. and a pKa of at least 9.0. 3-dimethylamino-1, 2-propanediol (DMAPD), 3-diethylaminopropane-1,2-diol, 2-hydroxymethyl-2-dimethylaminopropane-1,3-diol or 2-hydroxymethyl-2-diethylaminopropane-1,3-diol are examples of a tertiary alkanlamine meeting these criteria. In addition, 2-hydroxymethyl-2-methylaminopropane-1,3-diol and 2-methyl-2-hydroxyethylaminopropanol are sterically hindered amine of useful for this invention.

A physical solvent needs to be present in the solution used in the process of the invention. Preferred physical solvents include mono-functional and di-functional alcohols having a dielectric constant of lower than about 20 at 25° C. Useful alcohols include methoxytriglycol (MTG), methoxydiglycol (MDG), ethoxytriglycol, butoxytriglycol and mixtures thereof. Also useful as a physical solvent are glycol ethers such as methyl capped poly-ethylene glycol ethers and methyl capped poly-propylene glycol.

Generally, amine solutions useful in the invention are those which do not directly react with carbon dioxide to form carbamates. These are generally tertiary amines and sterically hindered amines. Further, it is desired for the amine to have a boiling point of at least about 160° C. and a pKa of at least 9.0. 3-dimethylamino-1, 2-propanediol (DMAPD), 3-diethylaminopropane-1,2-diol (DEAPD), 2-hydroxymethyl-2-dimethylaminopropane-1,3-diol (DMTA) or 2-hydroxymethyl-2-diethylaminopropane-1,3-diol (DETA) are examples of a tertiary alkanolamine meeting these criteria. In addition, 2-hydroxymethyl-2-methylaminopropane-1,3-diol (MTA) and 2-hydroxymethyl-2-ethylaminopropane-1,3-diol (ETA) are sterically hindered amines useful for this invention.

Further it has been found that using one or more constituents which decrease the dielectric properties of the composition is also preferable. Decreasing the dielectic properties of the composition is also preferable. Decreasing the dielectric properties of the composition has been found to increase the solubility of organic sulfur compounds in the solution.

If it desired to remove total acidic gas constituents including carbonaceous acidic gases from the oil and gas stream, an activator may be used in the composition of the invention. Useful activators include piperazine compounds such as hydroxyl ethyl piperazine, methyl piperazine, N-methyl piperazine, and piperazine as well as mixtures thereof. Also useful alone or in mixture with piperazines are amine compounds such as diethanolamine, N-methyl amine ethanol, 2-methyl-2-amino propanol, amino ethanolamine, 2-hydroxy methyl-2-methyl amino propane-1,3-diol, and mixtures thereof. The useful concentrations of activators range from about 0.1 wt-% to 20 wt-% of the amine solution depending upon the activator to be used.

Representative concentrations are:

Concentration Guidelines (Mass %)

|  | Useful | Preferable | More Preferable |
| --- | --- | --- | --- |
| Alkanolamine | 15-60 | 20-50 | 30-50 |
| Physical solvent | 5-60 | 10-50 | 20-40 |
| Water | 5-60 | 5-50 | 10-50 |

| PHYSICAL PROPERTIES | | | |
| --- | --- | --- | --- |
|  | General | Preferred | More Preferred |
| Amine pKa | 9.0-15.0 | 9.0-13.0 | 9.0-11.0 |
| Dielectric constant[1] | 5-25 | 10-25 | 10-20 |

[1]The dielectric constant specified is for the equal mass ratio mixture of amine and physical solvent.

The ranges of dielectric constant values were selected based on estimated values for a mixture of equal mass ratios of the amine and a physical solvent. The method used for estimation is discussed in Harvey and Prausnitz (1987). Examples for mixtures meeting and not meeting our dielectric constant criteria are shown in the table below for equal mass ratio mixtures of representative amines and physical solvents.

| Example | Mixture Composition | | Estimated Permittivity |
|---|---|---|---|
| 1 | MDEA | Ethylene glycol | 30.7 |
| 2 | MDEA | Diethylene glycol | 26.8 |
| 3 | MDEA | Triethylene glycol | 23.0 |
| 4 | MDEA | Methoxytriglycol | 17.5 |
| 5 | MDEA | Ethoxytriglycol | 16.9 |
| 6 | MDEA | Butoxytriglycol | 15.7 |
| 5 | MDEA | Glycerol | 30.6 |
| 6 | MDEA | Sulfolane | 31.5 |
| 7 | MDEA | Propylene Carbonate (PC) | 41.5 |
| 8 | MDEA | Ethylene carbonate (EC) | 52.8 |
| 8 | MDEA | Ethylene carbonate (EC) | 52.8 |
| 9 | MDEA | N-methyl-2-pyrrolidone (NMP) | 27.0 |
| 10 | Dimethylethanolamine | Ethylene glycol | 27.2 |
| 11 | Dimethylethanolamine | Diethylene glycol | 23.6 |
| 12 | Dimethylethanolamine | Triethylene glycol | 20.1 |
| 13 | Dimethylethanolamine | Methoxytriglycol | 15.2 |
| 14 | Dimethylethanolamine | Ethoxytriglycol | 14.6 |
| 15 | Dimethylethanolamine | Butoxytriglycol | 13.5 |
| 16 | Dimethylethanolamine | Glycerol | 26.9 |
| 17 | Dimethylethanolamine | Sulfolane | 27.8 |
| 18 | Dimethylethanolamine | Propylene Carbonate (PC) | 37.0 |
| 19 | Dimethylethanolamine | Ethylene carbonate (EC) | 47.2 |
| 20 | Dimethylethanolamine | N-methyl-2-pyrrolidone (NMP) | 24.0 |
| 21 | Triethanolamine | Ethylene glycol | 34.1 |
| 22 | Triethanolamine | Diethylene glycol | 30.0 |
| 23 | Triethanolamine | Triethylene glycol | 26.0 |
| 24 | Triethanolamine | Methoxytriglycol | 20.2 |
| 25 | Triethanolamine | Ethoxytriglycol | 19.5 |
| 26 | Triethanolamine | Butoxytriglycol | 18.2 |
| 27 | Triethanolamine | Glycerol | 34.1 |
| 28 | Triethanolamine | Sulfolane | 35.1 |
| 29 | Triethanolamine | Propylene Carbonate (PC) | 45.4 |
| 30 | Triethanolamine | Ethylene carbonate (EC) | 57.5 |
| 31 | Triethanolamine | N-methyl-2-pyrrolidone (NMP) | 30.1 |

From the table it can be seen that the amine as well as the physical solvent dielectric constant are important for meeting the criteria. For example, mixture 4 has a dielectric constant in the more preferred range, whereas mixture 24, which has the same physical solvent, but a more polar amine, does not. Compositions used in the invention may also comprise corrosion inhibitors, antifoaming agents and stripping aids, and mixtures thereof. Any number of corrosion inhibitors may be used in the methods and compositions of the invention which are consistent with the environment of use.

Here again, the composition of the invention may comprise antifoaming agents consistent with the environment of use. Exemplary antifoaming agents used in the oil and gas industry include silicone based defoamers and EO/PO based defoamers such as polysiloxane, and polypropylene glycol copolymers among others at a concentration of about 10 ppm to 200 ppm.

The composition of the invention may also comprise stripping aids such as mineral acids including phosphoric acid, sulfuric acid, boric acid and mixtures thereof at a concentration of about 0.1 wt % to 10 wt %.

PROCESSING

The invention set forth herein has great application in the petrochemical and energy industries. For example, the invention can be used for the treatment of fluid streams, gas, liquid, or mixtures, in an oil refinery, the treatment of sour gas, the treatment of coal steam gas, the treatment of hazardous stack emissions, the treatment of land field gases, and a new series of devices dealing with hazardous emissions for human safety.

The fluid streams to be treated by the process of the present invention contain an acid gas mixture which may include gases such as $CO_2$, $N_2$, $CH_4$, $C_2H_6$, $C_3H_8$, $H_2$, CO, $H_2O$, COS, $CS_2$, HCN, $NH_3$, $O_2$ as well as other organic sulfur compounds such as mercaptans, and the like. Often such gas mixtures are found in combustion gases, refinery gases, town gas, natural gas, syn gas, tail gas, water gas, propane, propylene, heavy hydrocarbon gases, etc. The aqueous amine solution herein is particularly effective when the fluid stream is a gaseous mixture, obtained, for example, from shale oil retort gas, coal or gasification of heavy oil with air/steam or oxygen/steam thermal conversion of heavy residual oil to lower molecular weight liquids and gases, or in sulfur plant tail gas clean-up operations.

The process of the present invention is preferably used to selectively remove H2S from a gas stream comprising other acid gas impurities, for example $N_2$, $CO_2$, $CH_4$, $C_2H_6$, $C_3H_8$, $H_2$, CO, $H_2O$, COS, HCN, $NH_3$, $O_2$, and/or mercaptans.

The absorption step of this invention generally involves contacting the fluid stream, preferably gaseous mixture, with the aqueous alkanolamine solution in any suitable contacting vessel, for examples of representative absorption processes see U.S. Pat. Nos. 5,736,115 and 6,337,059, both of which are incorporated herein by reference in their entirety. In such processes, the fluid stream containing $H_2S$ and/or other impurities from which the acid gases are to be removed may be brought into intimate contact with the aqueous alkanolamine solution using conventional means, such as a tower or vessel packed with, for example, rings or with sieve plates, or a bubble reactor.

In a typical mode of practicing the invention, the absorption step is conducted by feeding the fluid stream into the lower portion of the absorption tower while fresh aqueous alkanolamine solution is fed into the upper region of the tower. The fluid stream, freed largely from the $H_2S$ and $CO_2$ if present emerges from the upper portion (sometimes referred to as treated or cleaned gas) of the tower, and the loaded aqueous alkanolamine solution, which contains the absorbed $H_2S$ and $CO_2$, leaves the tower near or at its bottom. Preferably, the inlet temperature of the absorbent composition during the absorption step is in the range of from 60° F. to 300° F., and more preferably from 80° F. to 250° F. Pressures may vary widely; acceptable pressures are between 1 and 5,000 pounds per square inch (psi), preferably 2 to 2,500 psi, and most preferably 5 to 2,000 psi in the absorber. The contacting takes place under conditions such that the $H_2S$ is preferably absorbed by the solution. The absorption conditions and apparatus are designed so as to minimize the residence time of the aqueous alkanolamine solution in the absorber to reduce $CO_2$ pickup while at the same time maintaining sufficient residence time of the fluid stream with the aqueous absorbent composition to absorb a maximum amount of the $H_2S$ gas. Fluid streams with low partial pressures, such as those encountered in thermal conversion processes, will require less of the aqueous alkanolamine solution under the same absorption conditions than fluid streams with higher partial pressures such as shale oil retort gases.

A typical procedure for the $H_2S$ removal phase of the process comprises absorbing $H_2S$ via countercurrent contact of a gaseous mixture containing $H_2S$ and $CO_2$ with the aqueous alkanolamine solution of the amino compound in a column containing a plurality of trays at a temperature, of at least 60° F., and at a gas velocity of at least 0.3 feet per second (ft/sec, based on "active" or aerated tray surface), depending on the operating pressure of the gas, said tray column having fewer than 20 contacting trays, with, e.g., 4 to 16 trays being typically employed.

After contacting the fluid stream with the aqueous alkanolamine solution, which becomes saturated or partially saturated with $H_2S$, the solution may be at least partially regenerated so that it may be recycled back to the absorber. As with absorption, the regeneration may take place in a single liquid phase. Regeneration or desorption of the acid gases from the aqueous alkanolamine solution may be accomplished by conventional means of heating, expansion, stripping with an inert fluid, or combinations thereof, for example pressure reduction of the solution or increase of temperature to a point at which the absorbed $H_2S$ flashes off, or by passing the solution into a vessel of similar construction to that used in the absorption step, at the upper portion of the vessel, and passing an inert gas such as air or nitrogen or preferably steam upwardly through the vessel. The temperature of the solution during the regeneration step should be in the range from 120° F. to 400° F. and preferably from 140° F. to 300° F., and the pressure of the solution on regeneration should range from 0.5 psi to 100 psi, preferably 1 psi to 50 psi. The aqueous alkanolamine solution, after being cleansed of at least a portion of the $H_2S$ gas, may be recycled back to the absorbing vessel. Makeup absorbent may be added as needed.

In a preferred regeneration technique, the total organic sulfur compounds-rich aqueous amine solution is sent to the regenerator wherein the absorbed components are stripped by the steam which is generated by boiling the solution. Pressure in the flash drum and stripper is usually 1 psi to 50 psi, preferably 5 psi to 30 psi, and the temperature is typically in the range from 120° F. to 340° F., preferably 170° F. to 300° F. Stripper and flash temperatures will, of course, depend on stripper pressure; thus at 15 psi to 30 psi stripper pressures, the temperature will be 170° F. to 250° F. during desorption. Heating of the solution to be regenerated may very suitably be affected by means of indirect heating with low-pressure steam. It is also possible, however, to use direct injection of steam. The resulting hydrogen sulfide-lean aqueous alkanolamine solution may be used to contact a gaseous mixture containing total organic sulfur compounds.

Figure 1:
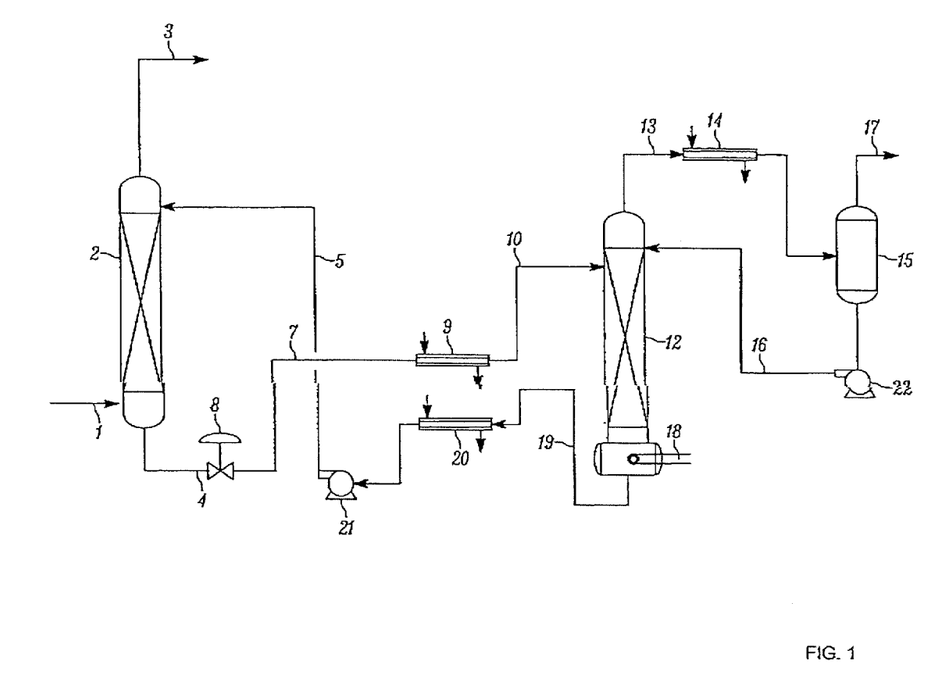
FIG. 1 is a schematic depiction of an exemplary gas treating apparatus and process.

FIG. 1 represents an example of a gas treating process. An aqueous amine absorbent solution is introduced via feed line 5 into the upper portion of a gas-liquid countercurrent packed-bed absorption column 2. The gas stream is introduced through feed line 1 into the lower portion of column 2 at a gas flow rate of 10 liter per minute. The absorber pressure is adjusted to 238 psia. The clean gas (i.e., reduced amounts of total organic sulfur compounds and $CO_2$) is discharged at the top of the absorber 2 through line 3 levels of acid gases are determined by gas chromatography (GC) analysis. The aqueous amine solution loaded with total organic sulfur compounds and $CO_2$ flows toward the lower portion of the absorber, and leaves via line 4. The aqueous amine in line 4 is reduced in pressure by the level control valve 8 and flows through line 7 to heat exchanger 9, which heats the loaded aqueous solution. The hot rich solution enters the upper portion of the regenerator 12 via line 10. The regenerator 12 is equipped with random packing which effects desorption of the total organic sulfur compounds and $CO_2$ gases. The pressure of the regenerator is set at 17 psia. The gases are passed through line 13 into condenser 14 wherein cooling and condensation of any residual water and amine occurs. The gases enter a separator 15 wherein the condensed liquid is separated from the vapor phase. The condensed aqueous solution is pumped via pump 22 through line 16 to the upper portion of the regenerator 12. The gases remaining from the condensation are removed through line 17 for final collection and/or disposal. The regenerated aqueous solution flows down through the regenerator 12 and the close-coupled reboiler 18. The reboiler 18, equipped with an electrical heating device, vaporizes a portion of the aqueous solution to drive off any residual gases. The vapors rise from the reboiler and are returned to the regenerator 12 which comingle with falling liquid and then exit through line 13 for entry into the condensation stage of the process. The regenerated aqueous solution from the reboiler 18 leaves through line 19 and is cooled in heat exchanger 20, and then is pumped via pump 21 back into absorber 2 through feed line 5.

Preferably, solutions of the invention are introduced into a gas treating process via line 4, 5, 10, 13, 16 and/or 19.

Preferably the clean gas contains equal to or less than 20 ppm of total organic sulfur compounds meeting some environmental regulations, more preferably equal to or less than 10 ppm total organic sulfur compounds.

A preferred embodiment of the invention involves performing the method of the invention continuously, or as a continuous process. However, the method may be performed batch wise or semi-continuously. Selection of the type of process used should be determined by the conditions, equipment used, type and amount of gaseous stream, and other factors apparent to one of ordinary skill in the art based on the disclosure herein.

WORKING EXAMPLES

The following examples provide a non-limiting illustration of certain embodiments of the invention.

$CO_2$ Acid Gas Carrying Capacity by Headspace Analysis of Glycol-Amine Mixtures.

A 40 wt % aqueous solution of MDEA is compared with solutions containing 40 wt % of tested amine, 20 wt % of water and 40 wt % of a physical solvent. The solutions are loaded with about 1, 2.5 and 5 wt % of $CO_2$ and then analyzed by headspace analysis at 40° C. and 40 psig. The results are set forth in FIG. 2.

Figure 2:
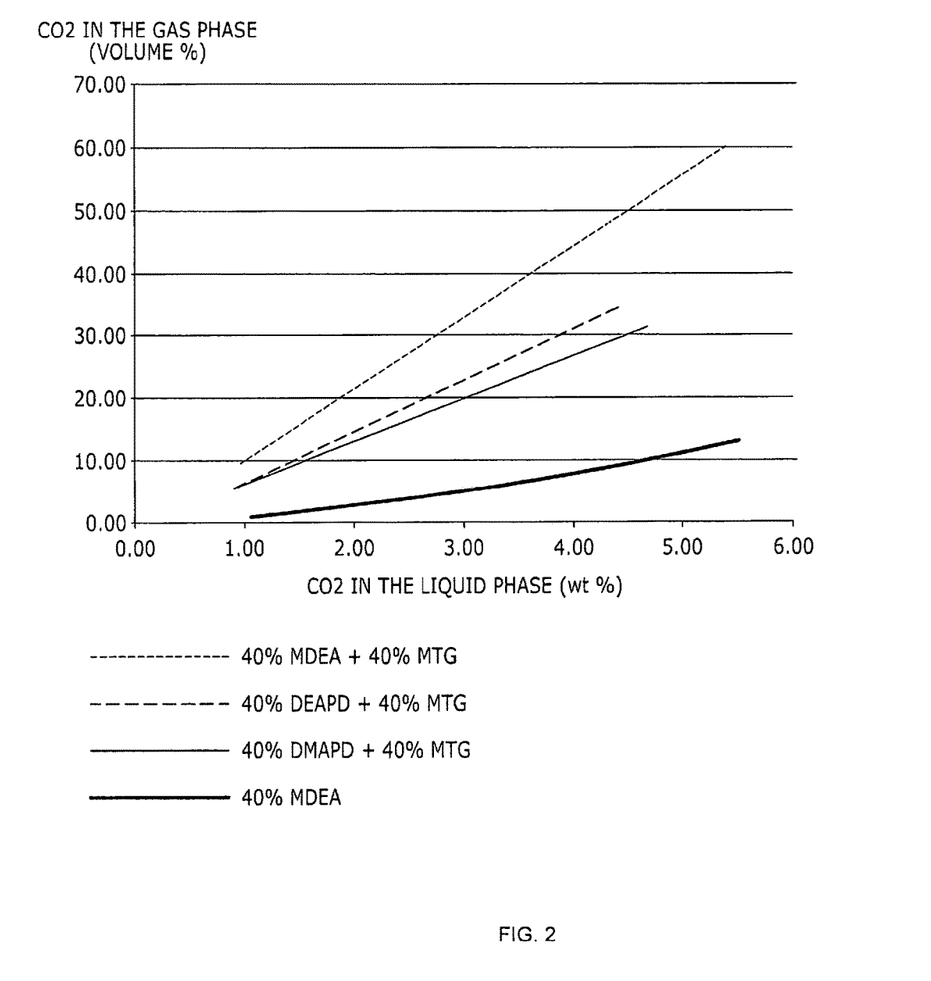
FIG. 2 is a graph depicting $CO_2$ acid gas carrying capacity by Headspace Analysis of Glycol-Amine Mixtures.

The results are showing that formulations comprising amines with a pKa of at least 9.0 (DMAPD & DEAPD) display higher capacity for $CO_2$ compared to formulations comprising amines with a pKa lower than 9.0 (MDEA).

H2S Acid Gas Carrying Capacity by Headspace Analysis of Glycol-Amine Mixtures.

A 40 wt % aqueous solution of MDEA is compared with solutions containing 40 wt % of tested amine, 20 wt % of water and 40 wt % of a physical solvent. The solutions are loaded with about 1, 2.5 and 5 wt % of $H_2S$ and then analyzed by headspace analysis at 40° C. and 40 psig. The results are set forth in FIG. 3.

Figure 3:
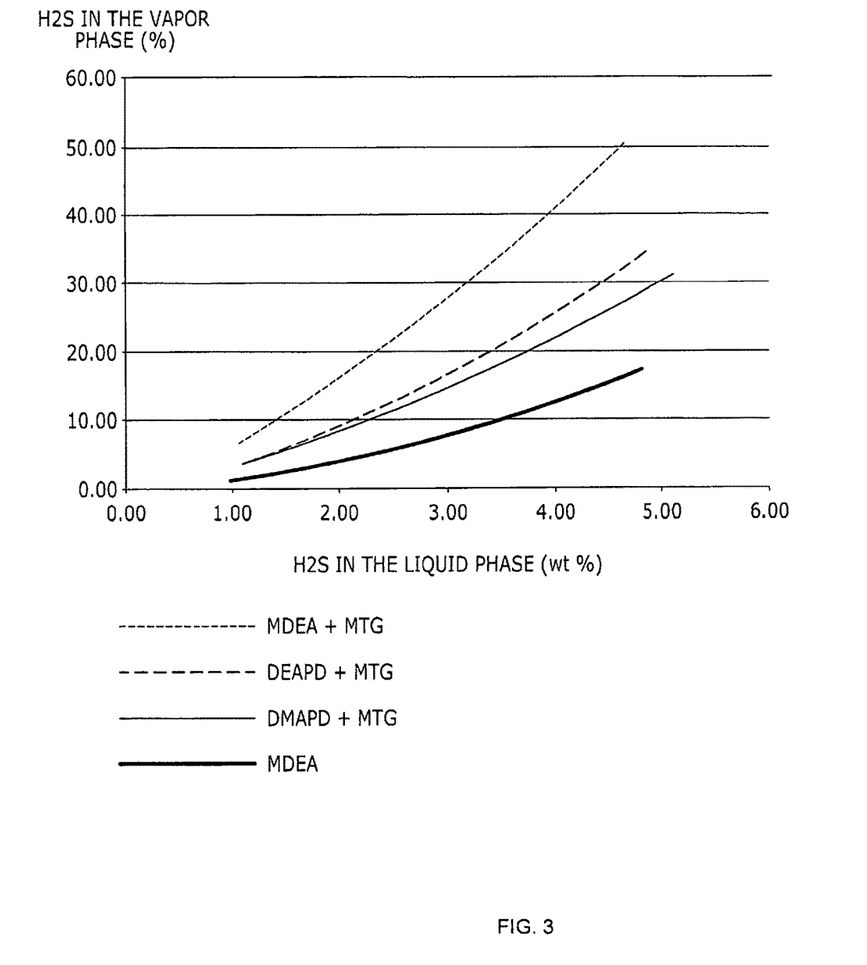
FIG. 3 is a graph depicting H2S acid gas carrying capacity by Headspace Analysis of Glycol-Amine Mixtures.

The results are showing that formulations comprising amines with a pKa of at least 9.0 (DMAPD & DEAPD) display higher capacity for $H_2S$ compared to formulations comprising amines with a pKa lower than 8.7 (MDEA).

MeSH Acid Gas Carrying Capacity by Headspace Analysis of Glycol-Amine Mixtures.

A 40 wt % aqueous solution of MDEA is compared with solutions containing 40 wt % of tested amine, 20 wt % of water and 40 wt % of a physical solvent. Sulfuric acid (0.3 mol of acid per mol of amine) is added in each solution and the vial headspaces are loaded to 8.3, 16.7, 33.3 and 75% of MeSH and then analyzed by headspace analysis at 40° C. and 40 psig. The results are set forth in FIG. 4.

Figure 4:
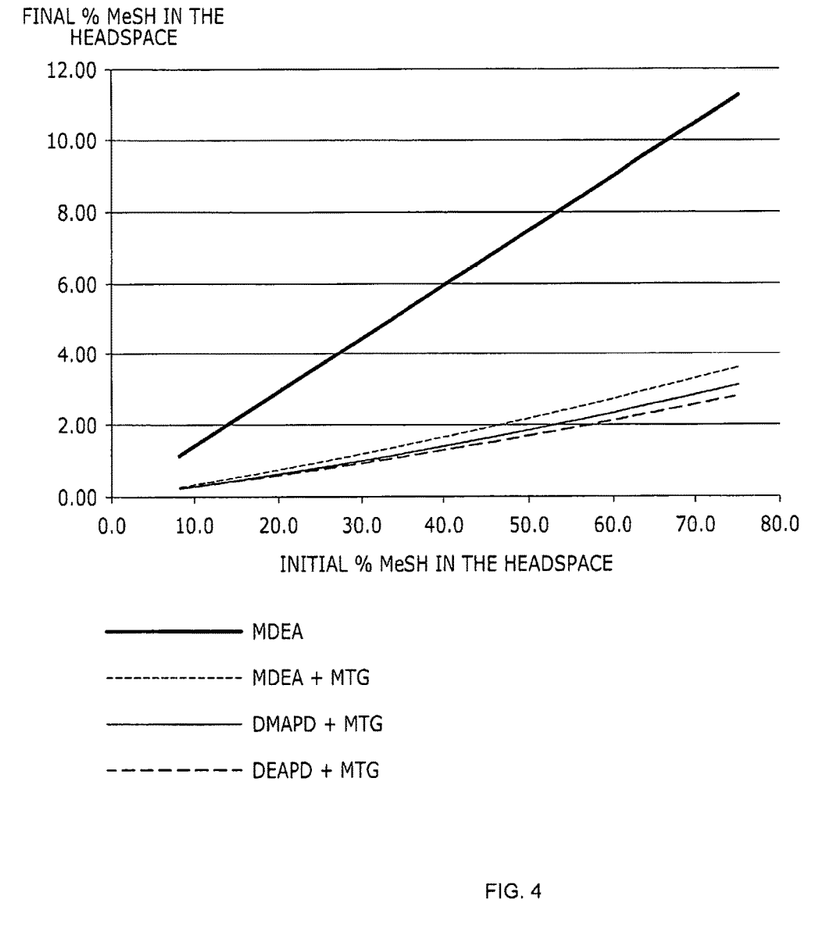
FIG. 4 is a graph depicting MeSH acid gas carrying capacity by Headspace Analysis of Glycol-Amine Mixtures.

The results are showing that formulations comprising a physical solvent display better performance in the removal of MeSH than aqueous solution. In addition, amines with a pKa of at least 9.0 (DMAPD & DEAPD) display higher capacity for MeSH compared to formulations comprising amines with a pKa lower than 9.0 (MDEA).

Finally the impact of the amount of sulfuric acid on MeSH removal has been studied. In a formulation containing 40 wt % DMAPD, 40 wt % MTG and 20 wt % water, sulfuric acid is added at 0.2, 0.4 and 0.6 mol of acid per mol of amine. Then, the vial headspaces are loaded to 41.7% MeSH and then analyzed by headspace analysis at 40° C. and 40 psig.

| | H2SO4 (mol/mol) | Average MeSH in the Headspace | H2SO4 (mol/mol) the Headspace |
|---|---|---|---|
| 1 | 0.2 | 1318.2 | 1.49 |
| 2 | 0.4 | 1355.7 | 1.54 |
| 3 | 0.6 | 1541.4 | 1.75 |

The results indicate that the amount of sulfuric acid has little influence on the performance of MeSH removal. Thus, formulations displaying greater capacity for acid gases such as $CO_2$ and $H_2S$ will still be capable of removing MeSH. VLE Acquired by Headspace Analysis of Glycol-Amine Mixtures.

Solution containing 50 wt % of amine, 25 wt % of water and 25 wt % of a physical solvent are loaded with about 1, 2.5 and 5 wt % of $H_2S$ and then studied by headspace analysis at 50° C. and 20 psig. The results are set forth in FIG. 5.

The dielectric constant of physical solvents can be used as a value to indicate for their polarity.

| | Physical Solvent | | | | |
|---|---|---|---|---|---|
| | MTG | TEG | EG | Glycerol | Water |
| Dielectric Constant | 13 | 24 | 40 | 41 | 78 |

Figure 5:
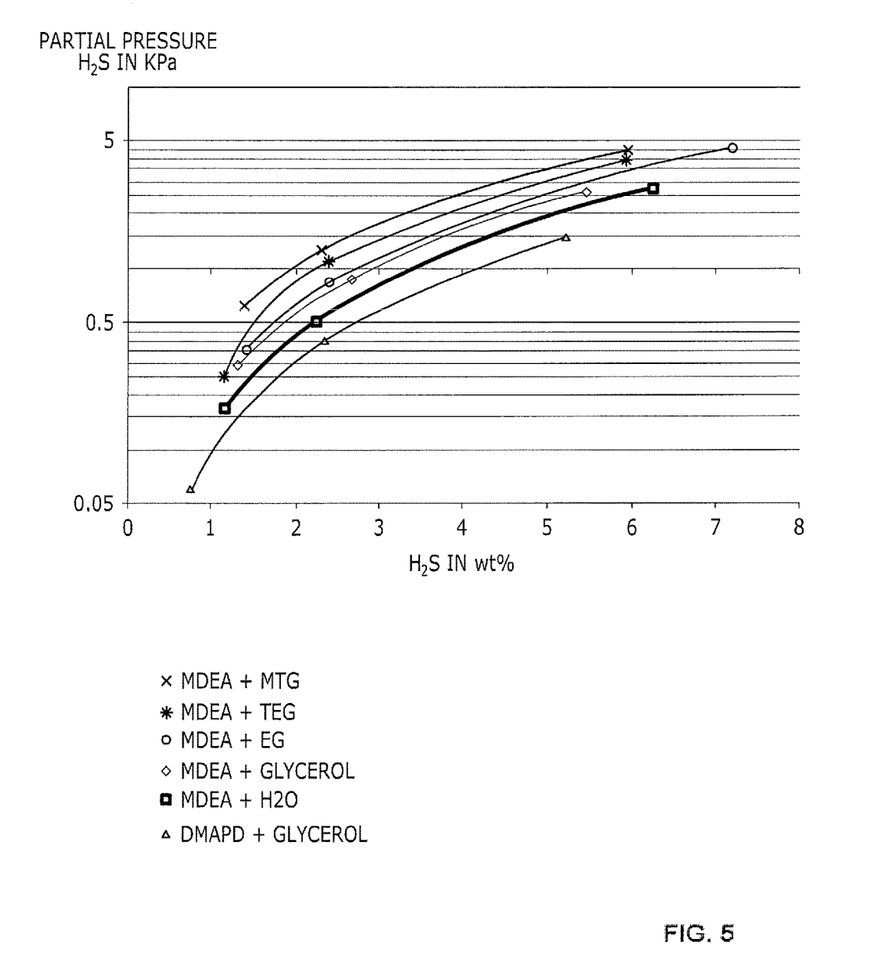
FIG. 5 is a graph depicting VLE acquired by Headspace Analysis of Glycol-Amine Mixtures.

The results are showing that, as the polarity of the molecule replacing water increase (MTG<TEG<EG<Glycerol), the capacity of the formulation for acid gases increases.

Although the present invention has been described by reference to its preferred embodiment as is disclosed in the specification and drawings above, many more embodiments of the present invention are possible without departing from the invention. Thus, the scope of the invention should be limited only by the impended claims.

The claimed invention is:

1. A method of treating oil and gas streams to remove total organic sulfur and total acidic gases, said method comprising:
   treating said oil and gas streams with an aqueous solution, said aqueous solution comprising:
      an amine selected from the group consisting of 3-dimethylamino-1, 2-propanediol, 3-diethylaminopropane-1,2-diol, 2-hydroxymethyl-2-dimethylaminopropane-1,3-diol, 2-hydroxymethyl-2-diethylaminopropane-1,3-diol, dimethylethanolamine, 2-hydroxymethyl-2-methylaminopropane-1,3-diol, 2-hydroxymethyl-2-ethylaminopropane-1,3-diol; and mixtures thereof;
      a physical solvent, wherein said physical solvent is a monohydric glycol ether having the formula:

wherein R is a Methyl group, Ethyl group, Propyl group, or Butyl group, and n=1-5; and
   an activator.

2. The method of claim 1, wherein said activator is selected from the group consisting of piperazine, hydroxyethylpiperazine, diethanolamine, N-methylaminoethanol, 2-methylpiperazine, N-methylpiperazine, 2-methyl-2-aminopropanol, or monoethanolamine.

3. The method of claim 1, wherein said physical solvent is present at a concentration from about 5 wt % to 60 wt %.

4. The method of claim 1, wherein said aqueous solution additionally comprises an acid, wherein said acid is selected from the group consisting of phosphoric acid, boric acid, sulfuric acid, and mixtures thereof.

5. The method of claim 1, wherein an equal mass ratio mixture of the amine and physical solvent displays a dielectric constant of less than 20 at 25° C.; and
   wherein the pKa of said amine is at least 9.0 at 25° C.

6. The method of claim 1, wherein said amine has a pKa of 9.0 to 11 at 25° C. and a normal boiling point of at least 200° C.

7. The method of claim 1, wherein the dielectric constant of said aqueous solution ranges from 5 to 20 at 25° C.

8. The method of claim 1, wherein said physical solvent is selected from the group consisting of methoxytriglycol, methoxydiglycol, ethoxytriglycol, butoxytriglycol, methyl capped poly-ethylene glycol ethers, methyl capped poly-propylene glycol, and mixtures thereof.

* * * * *